No. 718,443. PATENTED JAN. 13, 1903.
P. H. FISHELL.
OILER FOR VEHICLE HUBS.
APPLICATION FILED DEC. 17, 1901.
NO MODEL

Witnesses
Inventor
Peter H. Fishell
By Wm. N. Moore,
Attorney

UNITED STATES PATENT OFFICE.

PETER H. FISHELL, OF MARION, IOWA.

OILER FOR VEHICLE-HUBS.

SPECIFICATION forming part of Letters Patent No. 718,443, dated January 13, 1903.

Application filed December 17, 1901. Serial No. 86,287. (No model.)

*To all whom it may concern:*

Be it known that I, PETER H. FISHELL, a citizen of the United States, residing at Marion, in the county of Linn and State of Iowa, have invented certain new and useful Improvements in Oilers for Vehicle-Hubs, of which the following is a specification, reference being had therein to the accompanying drawings.

This invention relates to improvements in self-oiling vehicle-hubs; and the object of the invention is to provide a simple and cheap device readily applied to the hub of a wheel to lubricate the axle and to insure the uniform flow of the lubricant.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1:
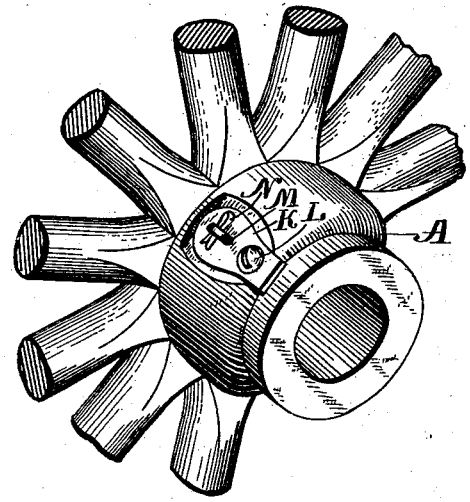
Figure 2:
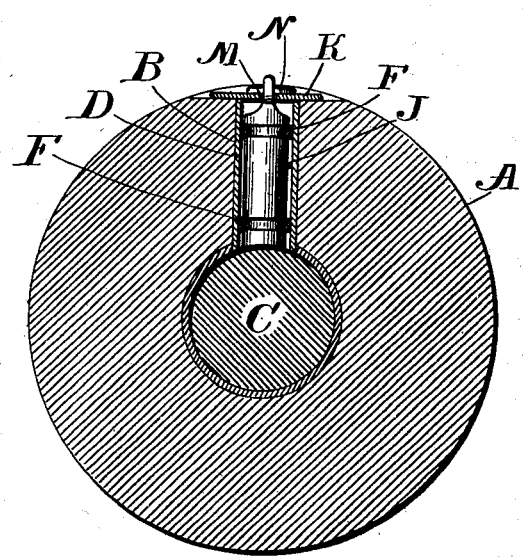
Figure 3:
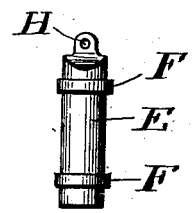
Figure 4:
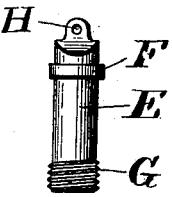

Figure 1 is a perspective view of a hub provided with my improvements. Fig. 2 is a cross-section through the same. Fig. 3 is an enlarged detail of the plug removed. Fig. 4 is a similar view of another form of plug.

Like letters of reference indicate like parts throughout the several views.

A is the hub, provided with a cylindrical bore or passage B, which leads from the outer face of the hub to the axial bore for the axle C. In this passage B, I place the metal tube or sleeve D, which extends into an opening in the metal sleeve lining the axial bore of the hub, as seen in Fig. 2, and this tube receives the plug E, which fits loosely therein. This plug in the form seen in Fig. 4 is provided with an annular groove near one end, in which is fitted the elastic band or ring F, which while serving to frictionally hold the plug in place against displacement provides a space J around the plug, in which the oil may remain and pass therefrom to the bearing through the oil-circulating channels or grooves or threads G. (Seen in Fig. 4.) The upper portion of the plug is tapered to form a chamber at the top of the tube or sleeve D, and the extreme end of the plug is formed with a hole H to receive the fastening key or pin N, which bears against the plate K on the hub, pivoted at one end, as at L, and having a slot M for the passage of the end of the plug.

In the form of plug seen in Fig. 3 there are two bands or rings F, one near each end of the plug, fitted in the annular grooves in the plug, one near the upper and the other near the lower end of the said plug, forming between the rings the oil space or chamber J.

I would state that in the form of my oiler when I use the upper and lower bands forming the oil-chamber J said bands are elastic, and while they do not allow the oil to flow freely from said chamber they are sufficiently loose and move enough to allow the oil to pass from the chamber to the axle in sufficient quantity to insure a proper oiling of the axle. It will also be understood that the turning of the wheel on the ground imparts sufficient jolt to the hub to cause a slight movement of the bands and permit a proper flow of the oil from the chamber to the axle.

What I claim as new is—

1. The combination with a hub having a radial passage communicating with its axial bore, a metal sleeve fitting in said passage, a plug fitting in said sleeve and having its upper end tapered and formed with an eye, a plate having one end secured to the hub and having its other end formed with a slot to snugly fit over the eye, a spring-pin passing through the eye of the plug to secure it, and means on the plug forming an oil space or chamber between the plug and sleeve.

2. The combination with a hub having a radial passage communicating with its axial bore, of a metal sleeve in said passage, a plug fitted loosely within said sleeve, an elastic band around said plug near its upper end, there being oil-conveying threads on the plug at its lower end, a plate on the hub bearing on the end of said sleeve, and a fastening-pin passed through the outer end of the plate and bearing on said plate, substantially as described.

In testimony whereof I affix my signature in presence of two witnesses.

P. H. FISHELL.

Witnesses:
C. E. GORDON,
A. B. McKEAN.